US012596565B2

(12) United States Patent
Schmeilin et al.

(10) Patent No.: US 12,596,565 B2
(45) Date of Patent: Apr. 7, 2026

(54) USER ASSIGNED NETWORK INTERFACE QUEUES

(71) Applicant: Amazon Technologies, Inc., Seattle, WA (US)

(72) Inventors: Evgeny Schmeilin, Haifa (IL); Dileep Varma Bairraju, San Jose, CA (US); Georgy Zorik Machulsky, San Jose, CA (US); Said Bshara, Tira (IL)

(73) Assignee: Amazon Technologies, Inc., Seattle, WA (US)

( * ) Notice: Subject to any disclaimer, the term of this patent is extended or adjusted under 35 U.S.C. 154(b) by 564 days.

(21) Appl. No.: 17/957,939

(22) Filed: Sep. 30, 2022

(65) Prior Publication Data

US 2024/0111562 A1 Apr. 4, 2024

(51) Int. Cl.
*G06F 9/455* (2018.01)
(52) U.S. Cl.
CPC .. *G06F 9/45558* (2013.01); *G06F 2009/4557* (2013.01); *G06F 2009/45575* (2013.01)
(58) Field of Classification Search
CPC ......... G06F 9/45558; G06F 2009/4557; G06F 2009/45575; G06F 2009/45595
See application file for complete search history.

(56) References Cited

U.S. PATENT DOCUMENTS 7,733,891 B2 6/2010 Reynolds et al.
9,813,509 B1 * 11/2017 Visser ...................... G06F 9/547

10,331,600 B1 6/2019 Rajadnya et al.
11,036,529 B2 * 6/2021 Klein ................... G06F 9/45533
2008/0288661 A1 * 11/2008 Galles ...................... G06F 13/10
710/3
2012/0151472 A1 * 6/2012 Koch ................... G06F 9/45558
718/1
2015/0055468 A1 * 2/2015 Agarwal ............. H04L 47/2483
370/232
2018/0253331 A1 * 9/2018 Sato ...................... G06F 9/45558

FOREIGN PATENT DOCUMENTS

KR 2016 0081007 A 7/2016

OTHER PUBLICATIONS

International Search Report and Written Opinion for PCT/US2023/032754, mailed Jan. 8, 2024, 26 pages.

(Continued)

*Primary Examiner* — Jorge A Chu Joy-Davila
(74) *Attorney, Agent, or Firm* — Klarquist Sparkman, LLP

(57) ABSTRACT

An Application Programming Interface (API) allows a launching of a virtual machine where a queue count can be configured by a user. More specifically, each virtual machine can be assigned a pool of queues. Additionally, each virtual machine can have multiple virtual networking interfaces and a user can assign a number of queues from the pool to each virtual networking interface. Thus, a new metadata field is described that can be used with requests to launch a virtual machine. The metadata field includes one or more parameters that associate a number of queues with each virtual networking interface. A queue count can be dynamically configured by a user to ensure that the queues are efficiently used given that the user understands the intended application of the virtual machine being launched.

23 Claims, 8 Drawing Sheets

(56) References Cited

OTHER PUBLICATIONS

Hermann et al. "Red Hat Enterprises Linux 7 Virtualization Tuning and Optimization Guide," Jan. 1, 2016, pp. 1-51.
Anonymous: "VSIM Installation and Setup Guide Release 21.10. R1",, Oct. 1, 2021 (Oct. 1, 2021), pp. 1-78, XP093351757, Retrieved from the Internet: URL:https://documentation.nokia.com/cgi-bin/dbaccessfilename.cgi/3HE17166AAADTQZZA01_V1_Virtualized%207750%20SR%20and%207950%20XRS%20Simulator%20(vSIM)%20Installation%20and%20Setup%20Guide%2021.10.R1.pdf.
Office Action received for European Application No. 23 786 844. 3-1207, mailed on Jan. 15, 2026, 6 pages.

* cited by examiner

Figure 1:
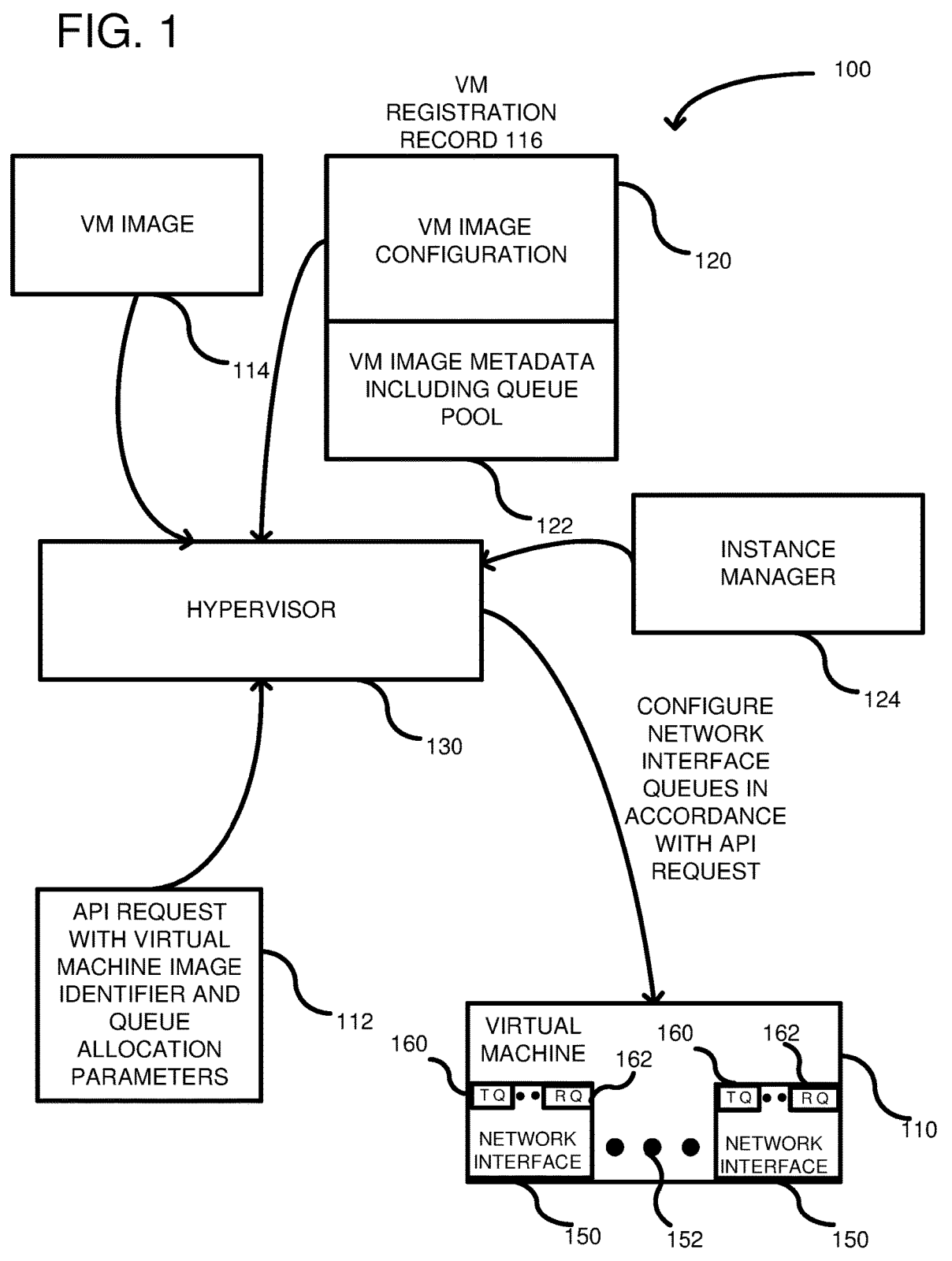

VM
REGISTRATION
RECORD 116

VM IMAGE

VM IMAGE
CONFIGURATION

120

114

VM IMAGE METADATA
INCLUDING QUEUE
POOL

122

INSTANCE
MANAGER

124

HYPERVISOR

130

CONFIGURE
NETWORK
INTERFACE
QUEUES IN
ACCORDANCE
WITH API
REQUEST

API REQUEST
WITH VIRTUAL
MACHINE IMAGE
IDENTIFIER AND
QUEUE
ALLOCATION
PARAMETERS

112

VIRTUAL
MACHINE

160

162

160

162

110

TQ • • RQ

TQ • • RQ

NETWORK
INTERFACE

• • •

NETWORK
INTERFACE

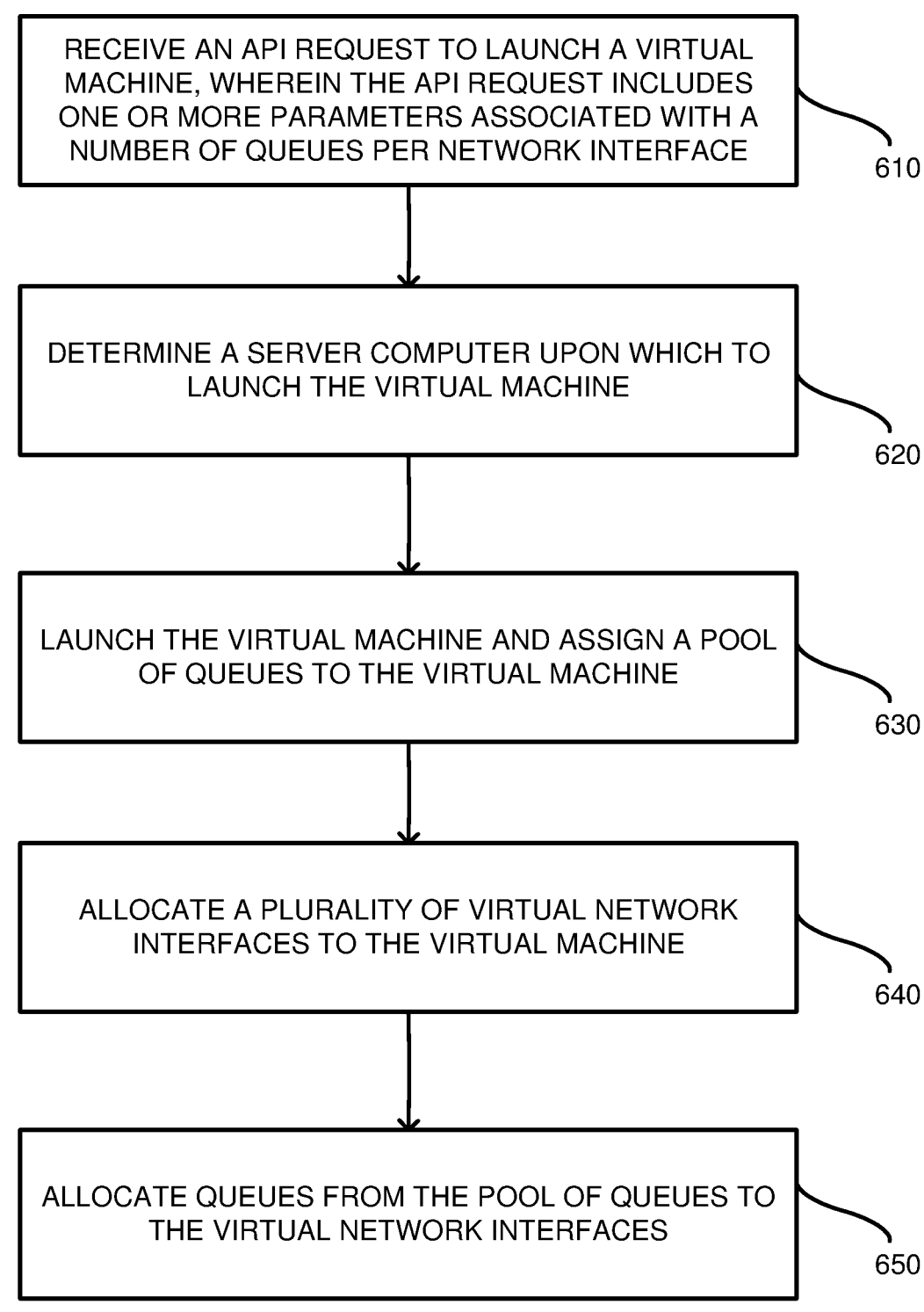

RECEIVE AN API REQUEST TO LAUNCH A VIRTUAL MACHINE, WHEREIN THE API REQUEST INCLUDES ONE OR MORE PARAMETERS ASSOCIATED WITH A NUMBER OF QUEUES PER NETWORK INTERFACE

610

DETERMINE A SERVER COMPUTER UPON WHICH TO LAUNCH THE VIRTUAL MACHINE

620

LAUNCH THE VIRTUAL MACHINE AND ASSIGN A POOL OF QUEUES TO THE VIRTUAL MACHINE

630

ALLOCATE A PLURALITY OF VIRTUAL NETWORK INTERFACES TO THE VIRTUAL MACHINE

640

ALLOCATE QUEUES FROM THE POOL OF QUEUES TO THE VIRTUAL NETWORK INTERFACES

650

RECEIVE A USER REQUEST TO LAUNCH A VIRTUAL MACHINE, THE REQUEST INCLUDES A QUEUE ALLOCATION DEFINING HOW MANY QUEUES SHOULD BE ASSOCIATED WITH ONE OR MORE NETWORK INTERFACES

710

LAUNCH THE VIRTUAL MACHINE WITH THE QUEUES ALLOCATED TO THE ONE OR MORE NETWORK INTERFACES IN ACCORDANCE WITH THE USER REQUEST

720

COMPUTING ENVIRONMENT 800

830 central processing unit 810 graphics or co-processing unit 815

MEMORY 820

MEMORY 825

COMMUNICATION CONNECTION(S) 870

INPUT DEVICE(S) 850

OUTPUT DEVICE(S) 860

STORAGE 840

SOFTWARE 880 IMPLEMENTING DESCRIBED TECHNOLOGIES

USER ASSIGNED NETWORK INTERFACE QUEUES

BACKGROUND

Cloud computing is the use of computing resources (hardware and software) which are available in a remote location and accessible over a network, such as the Internet. Users are able to consume these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

In a cloud computing environment, a virtual machine image contains an operating system (e.g., Linux) and other data needed to launch a virtual machine in a virtual environment. The virtual machine image is similar to a physical computer's disk volume, and can include a file system, an operating system and other components needed to boot up as a machine. To launch a virtual machine, hardware needs to be selected. The hardware selection is accomplished through instance types, which allow a variety of different sizes of memory, CPU capacity, I/O performance, etc. The combination of the virtual machine image and the instance type can be used to create an "instance" or a virtual machine.

The I/O performance is related to the network interface associated with the virtual machine. The network interface can have many transmit and receive queues that allow data to be communicated over a network. Typically, larger virtual machines with more CPUs have a larger number of queues. However, some virtual machines might be allocated to lower data throughput operations, such as a virtual machine that provides mainly management functions. In such a case, the virtual machine might not need the number of queues assigned to it. Other virtual machines might be focused on data transmission and have an insufficient number of queues. Better queue utilization is needed in current cloud environments.

BRIEF DESCRIPTION OF THE DRAWINGS

FIG. 1 is a system diagram showing a launching of a virtual machine with customized network interface queues.

FIG. 2 is an example system diagram showing a plurality of virtual machine instances running in a multi-tenant environment.

FIG. 6 is a flowchart according to one embodiment for customizing queues in accordance with a user request.

DETAILED DESCRIPTION

Figure 3:
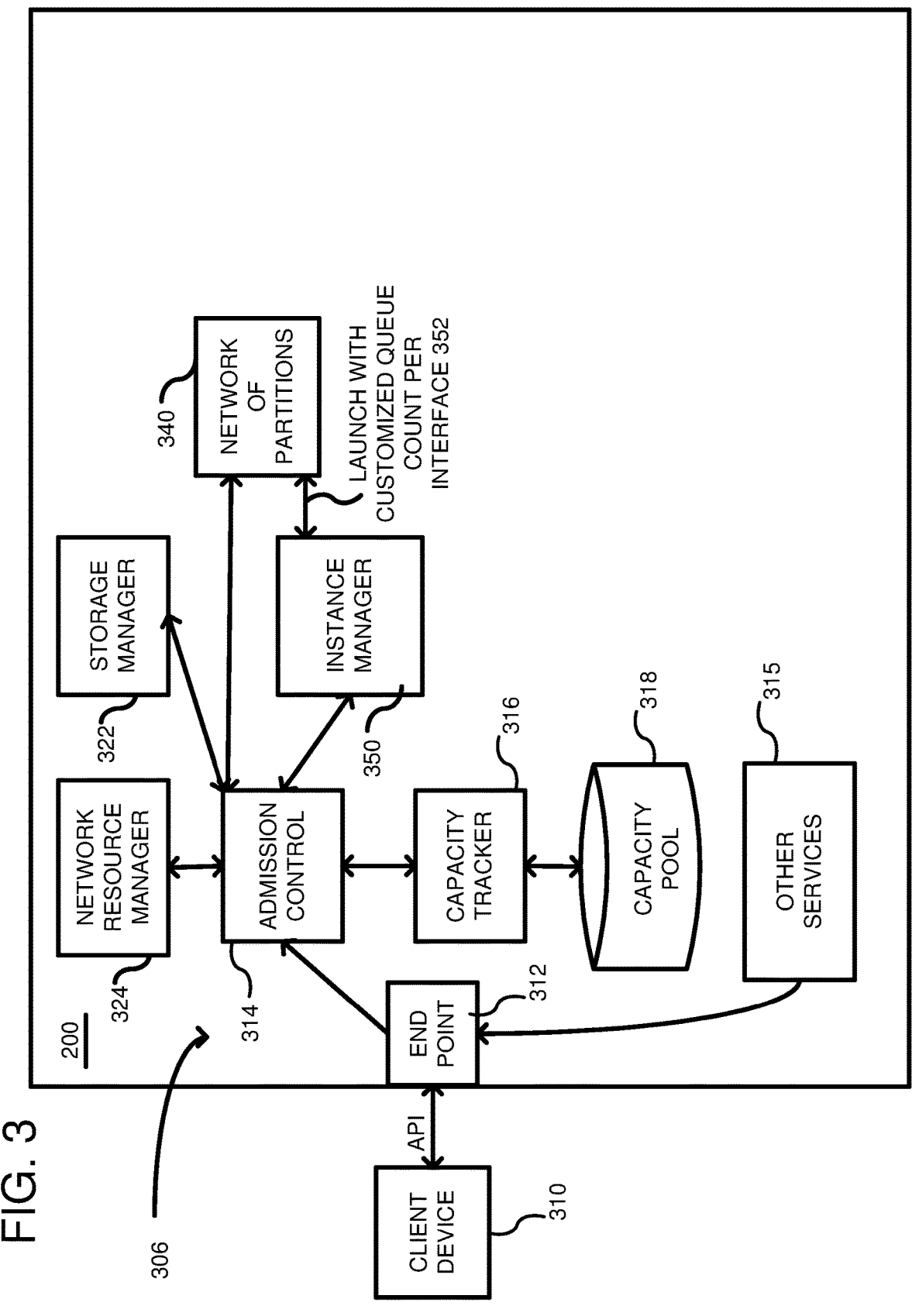
FIG. 3 shows further details of an example system including a plurality of management components associated with a control plane.

In a cloud environment, each virtual networking interface has a limited number of queues with which a virtual machine instance can work. Ideally, each processor associated with a virtual machine can be allocated its own network queue to avoid contentions/locking and cache pollution. However, each queue takes a significant amount of resources including memory and hardware acceleration resources on an interface card and host memory (e.g., kernel buffers and interrupts). User experience is often compromised due to the supported number of network interfaces per virtual machine and number of queues per network interface.

An Application Programming Interface (API) allows a launching of a virtual machine where a queue count can be configured by a user. More specifically, each virtual machine can be assigned a pool of queues. Additionally, each virtual machine can have multiple virtual networking interfaces and a user can assign a number of queues from the pool to each virtual networking interface. Thus, a new metadata field is described that can be used with requests to launch a virtual machine. The metadata field includes one or more parameters that associate a number of queues with each virtual networking interface. A queue count can be dynamically configured by a user to ensure that the queues are efficiently used given that the user understands the intended application of the virtual machine being launched. Although generally described in relation to virtual machines, a user can also configure a number of queues in other applications, such as a number of queues between a storage service and local storage.

FIG. 1 is a system diagram 100 in which a virtual machine is launched and configured in accordance with a user request. To launch a virtual machine 110, an API call 112 is made with a virtual machine image identifier. The identifier can be used to identify a virtual machine (VM) image 114 (also called a "machine image") and a VM registration record 116. For example, the identifier can be used to determine the appropriate VM registration record 116, which can, in turn, point to the VM image 114. Alternatively, the identifier can be used to determine the VM image 114, which can include a pointer to the VM image registration record 116. Other implementations can also be used. The VM image 114 may be analogous to a hard disk drive volume and contains software to run in the virtual machine 110. For example, the VM image can include a file system, operating system, etc. needed to boot the virtual machine 110. The VM registration record 116 can include a VM image configuration 120 that identifies the virtual hardware used as a platform for the virtual machine image 114. Example data stored in the VM image configuration includes the architecture, the target virtualization type, an operating system type, which kernel to launch with, which additional virtual disk images should be attached to the instance once it is launched. The VM registration record 116 can further include metadata 122, which can include a pool of available queues that can be used for the particular VM image and can be used to further configure the VM 110 after it is launched. For example, the metadata 122 can be free-form data that is interpreted by the VM 110. The metadata 122 can be stored and determined in a number of ways. For example, it can be included in the VM image configuration 120, the VM image configuration 120 can have a pointer to the metadata 122, there can be a separate record that points to both the VM image configuration and separately to the metadata 122, etc. Additionally, the metadata 122 can be stored in one or more files. When the API call 112 is received, an instance manager 124 can use the VM image identifier to determine the associated VM image 114 and VM image configuration 120. The instance manager 124 can then launch the virtual machine 110 using the VM image 114 in conjunction with the VM image configuration 120. The VM 110 can include code for retrieving the metadata 122. The instance manager 124 can retrieve the queue pool data in the metadata 122 and use it in launching the VM 110. Alternatively, the supplied metadata 122 can be interpreted by the VM 110 or otherwise executed by the VM. Generally, customization of the VM 110 using the metadata 122 occurs after launch of the VM or during the launch by the instance manager 124. The instance manager 124 can direct a hypervisor 130 to configure the virtual machine 110 with network interfaces customized in accordance with the API request 112. More particularly, the instance manager 124 knows the available number of queues in the queue pool from the metadata 122 and can allocate queues to the virtual machine 110 from the queue pool by instructing the hypervisor 130 in accordance with the user request 112. In this way, the user has flexibility to use the queue pool in any desired manner including allocating all of the queues in the queue pool to one virtual machine interface.

As shown, the virtual machine 110 can be launched with any number of virtual network interfaces 150 (as indicated by repeating dots 152). Each network interface 150 includes transmit queues 160 (TQ) and receive queues 162 (RQ). The hypervisor 130 can use Base Address Registers (BARs) to define the location in memory of the queues 160, 162. More specifically, each queue is a set of registers and those registers are placed on the BAR by the hypervisor 130. The number of transmit and receive queues 160, 162 is controlled by the user via the API request 112, with the limitation that the desired number cannot exceed the queue pool number 122. Thus, the user can select any desired number of queues from the queue pool and assign the queues to the network interfaces to customize the queues on the network interfaces in a virtual machine. In other embodiments, the API can be used to dynamically change the queue allocation on a VM that is active. Thus, the API need not be associated with a new launch of a VM, but, rather, can change an existing allocation. In such a case, the user can include an identifier of the VM, together with a list of interfaces and their associated queue allocation. Such a dynamic allocation can occur when a virtual network interface 150 detaches and then reattaches to the virtual machine 110.

As described further below, when the API request is made, it is received by a service. Services are commonly used in cloud computing. A service is a software function provided at a network address over the web or the cloud. Clients initiate service requests to servers and servers process the requests and return appropriate responses. The client service requests are typically initiated using, for example, an API request, such as request 112. For purposes of simplicity, service requests will be generally described below as API requests, but it is understood that other service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

Figure 2:
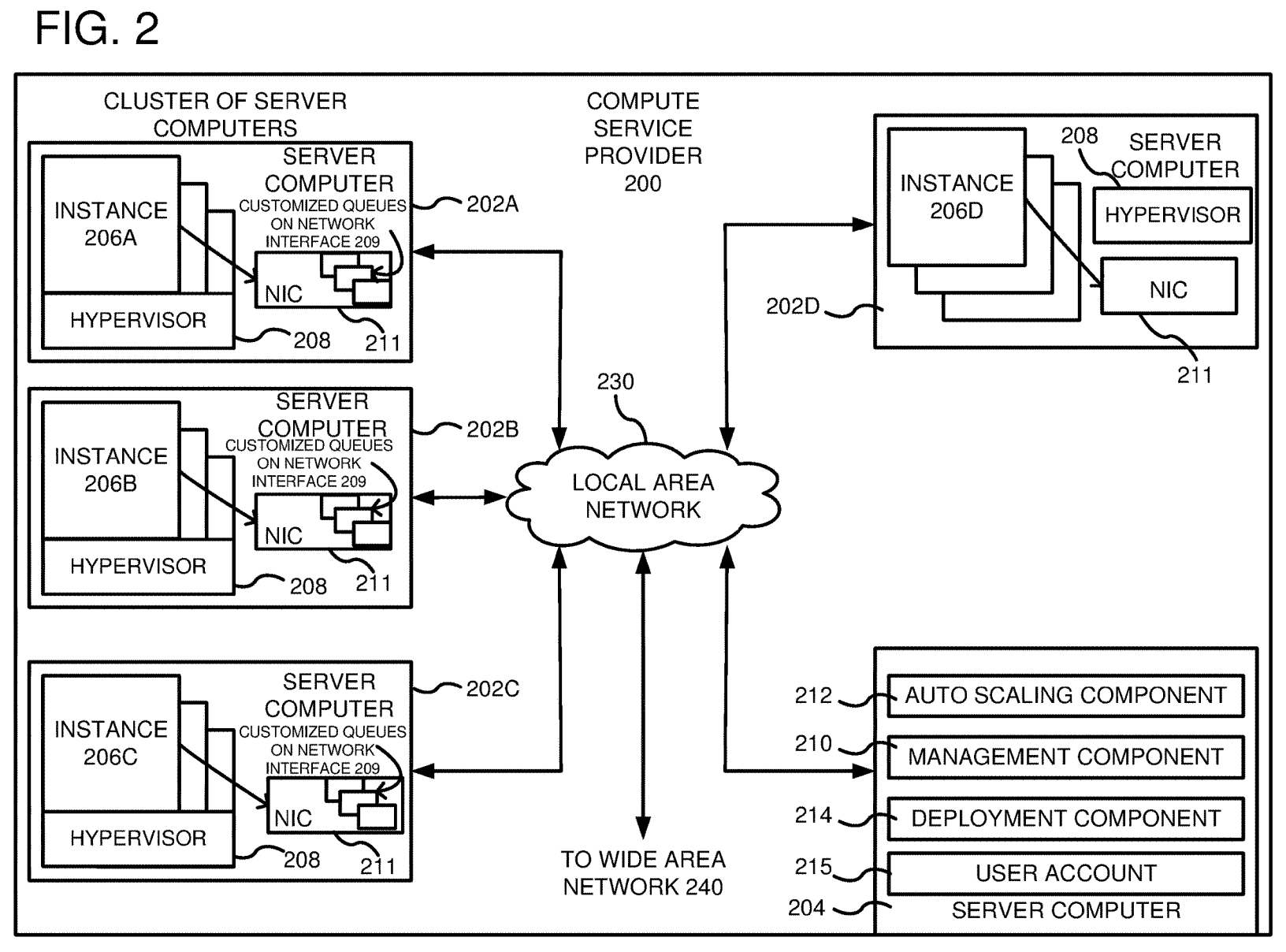

FIG. 2 is a computing system diagram of a network-based compute service provider 200 that illustrates one environment in which embodiments described herein can be used. By way of background, the compute service provider 200 (i.e., the cloud provider) is capable of delivery of computing and storage capacity as a service to a community of end recipients. In an example embodiment, the compute service provider can be established for an organization by or on behalf of the organization. That is, the compute service provider 200 may offer a "private cloud environment." In another embodiment, the compute service provider 200 supports a multi-tenant environment, wherein a plurality of users operate independently (i.e., a public cloud environment). Generally speaking, the compute service provider 200 can provide the following models: Infrastructure as a Service ("IaaS"), Platform as a Service ("PaaS"), and/or Software as a Service ("SaaS"). Other models can be provided. For the IaaS model, the compute service provider 200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 200 using networked client devices, such as desktop computers, laptops, tablets, smartphones, etc. running web browsers or other lightweight client applications. Those skilled in the art will recognize that the compute service provider 200 can be described as a "cloud" environment.

In some implementations of the disclosed technology, the compute service provider 200 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs are the primary backbone locations linking users to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 200 includes a plurality of server computers 202A-202D. While only four server computers are shown, any number can be used, and large centers can include thousands of server computers. The server computers 202A-202D can provide computing resources for executing software instances 206A-206D. In one embodiment, the instances 206A-206D are VMs. As known in the art, a virtual machine is an instance of a software implementation of a machine (i.e. a computer) that executes applications like a physical machine. In the example of virtual machine, each of the servers 202A-202D can be configured to execute a hypervisor 208 or another type of program configured to enable the execution of multiple instances 206 on a single server. Additionally, each of the instances 206 can be configured to execute one or more applications. As shown at 209, the hypervisor 208 can configure the instances 206A-C by attaching virtual network interfaces to the instances, wherein the virtual network interfaces have customized queues in accordance with a user request and are positioned on physical network interface cards (NICs) 211. Alternatively, as shown at server computer 202D, customization is not required and a default number of queues can be used on the NIC 211. Although 3 queues 209 are shown, there are generally any number of queues with a different virtual NIC for each of the multiple instances, such as shown at 206A. Additionally, the customized queues 209 can be shared between networking and storage. For example, there can be a first set of queues 209 for networking and a second set of queues 209 for storage. Additionally, a same pool of queues can be used for both networking and storage. Alternatively, networking and storage can have separate pools of queues used for generating the customized queues 209.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 204 can be reserved for executing software components for managing the operation of the server computers 202 and the instances 206. For example, the server computer 204 can execute a management component 210. A user can access the management component 210 to configure various aspects of the operation of the instances 206 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 212 can scale the instances 206 based upon rules defined by the user. In one embodiment, the auto scaling component 212 allows a user to specify scale-up rules for use in determining when new instances should be instantiated and scale-down rules for use in determining when existing instances should be terminated. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist users in the deployment of new instances 206 of computing resources. The deployment component can have access to account information associated with the instances, such as who is the owner of the account, credit card information, country of the owner, etc. The deployment component 214 can receive a configuration from a user that includes data describing how new instances 206 should be configured. For example, the configuration can specify one or more applications to be installed in new instances 206, provide scripts and/or other types of code to be executed for configuring new instances 206, provide cache logic specifying how an application cache should be prepared, and other types of information. The deployment component 214 can utilize the user-provided configuration and cache logic to configure, prime, and launch new instances 206. Additionally, the deployment component can use parameters received in an API request to configure queues on network instances. The configuration, cache logic, and other information may be specified by a user using the management component 210 or by providing this information directly to the deployment component 214. The instance manager can be considered part of the deployment component.

User account information 215 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc. In some cases, instead of providing a queue allocation in an API (as in FIG. 1), the user can specify the queue allocation in the user account 215.

A network 230 can be utilized to interconnect the server computers 202A-202D and the server computer 204. The network 230 can be a local area network (LAN) and can be connected to a Wide Area Network (WAN) 240 so that end users can access the compute service provider 200. It should be appreciated that the network topology illustrated in FIG. 2 has been simplified and that many more networks and networking devices can be utilized to interconnect the various computing systems disclosed herein.

FIG. 3 illustrates in further detail management components 306 that can be used in the multi-tenant environment of the compute service provider 200. In order to access and utilize instances (such as instances 206 of FIG. 2), a client device can be used. The client device 310 can be any of a variety of computing devices, mobile or otherwise including a cell phone, smartphone, handheld computer, Personal Digital Assistant (PDA), desktop computer, etc. The client device 310 can communicate with the compute service provider 200 through an end point 312, which can be a DNS address designed to receive and process API requests. The API request can be one that specifies queue allocation on a virtual machine that is already launched to dynamically modify the queue allocation or the API request can be one that specifies queue allocation on a virtual machine and identifies the virtual machine to be launched. The end point 312 can be a web server configured to expose such an API. Using the API requests, a client 310 can make requests to implement any of the functionality described herein. Other services 315, which can be internal to the compute service provider 200, can likewise make API requests to the end point 312.

Other general management services that may or may not be included in the compute service provider 200 include an admission control 314, e.g., one or more computers operating together as an admission control service. The admission control 314 can authenticate, validate and unpack the API requests for service or storage of data within the compute service provider 200. The capacity tracker 316 is responsible for determining how the servers need to be configured in order to meet the need for the different instance types by managing and configuring physical inventory in terms of forecasting, provisioning and real-time configuration and allocation of capacity. The capacity tracker 316 maintains a pool of available inventory in a capacity pool database 318. The capacity tracker 316 can also monitor capacity levels so as to know whether resources are readily available or limited. An instance manager 350 controls launching and termination of instances in the network. When an instruction is received (such as through an API request) to launch an instance, the instance manager pulls resources from the capacity pool 318 and launches the instance on a decided upon host server computer. As shown at 352, the instance that is launched can have a customized queue allocation for virtual network interfaces associated with the virtual machine. In particular, a number of transmit and receive queues allocated to each network interface can be used in accordance with the API from the client device 310. Similar to the instance manager are the storage manager 322 and the network resource manager 324. The storage manager 322 relates to initiation and termination of storage volumes, while the network resource manager 324 relates to initiation and termination of routers, switches, subnets, etc. A network of partitions 340 is described further in relation to FIG. 4 and includes a physical layer upon which the instances are launched.

Figure 4:
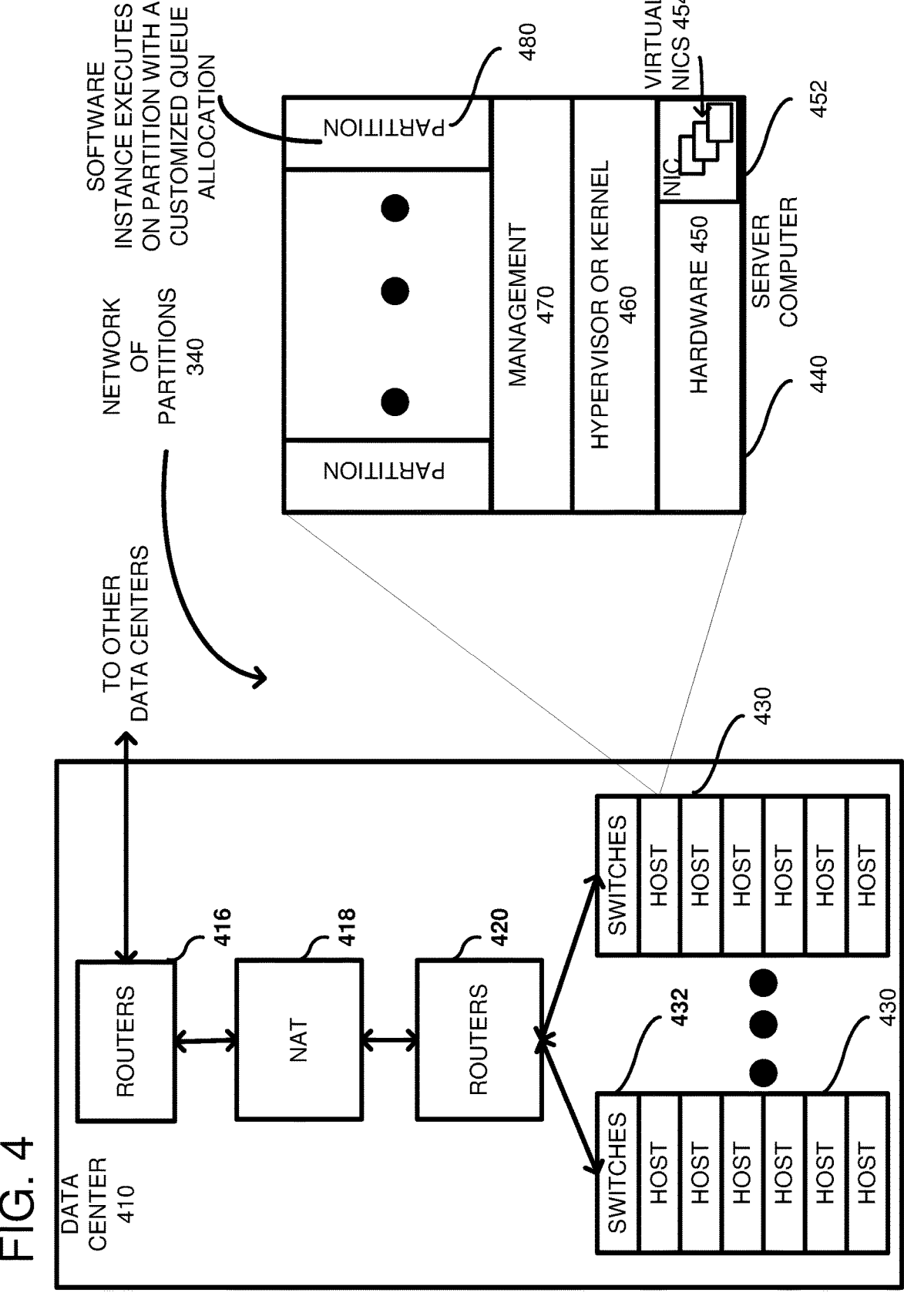
FIG. 4 shows an example of a plurality of host computers, routers and switches, which are hardware assets used for running virtual machine instances.

FIG. 4 illustrates the network of partitions 340 and the physical hardware associated therewith. The network of partitions 340 can include a plurality of data centers, such as data center 410, coupled together by routers 416. The routers 416 read address information in a received packet and determine the packet's destination. If the router decides that a different data center contains a host server computer, then the packet is forwarded to that data center. If the packet is addressed to a host in the data center 410, then it is passed to a network address translator (NAT) 418 that converts the packet's public IP address to a private IP address. The NAT also translates private addresses to public addresses that are bound outside of the datacenter 410. Additional routers 420 can be coupled to the NAT to route packets to one or more racks of host server computers 430. Each rack 430 can include a switch 432 coupled to multiple host server computers. A particular host server computer is shown in an expanded view at 440.

Each host 440 has underlying hardware 450 including one or more CPUs, memory, storage devices, etc. The hardware 450 can include one or more NICs 452, which can host virtual NICs 454. Running a layer above the hardware 450 is a hypervisor or kernel layer 460. The hypervisor or kernel layer can be classified as a type 1 or type 2 hypervisor. A type 1 hypervisor runs directly on the host hardware 450 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 470 can be part of the hypervisor or separated therefrom and generally includes device drivers needed for accessing the hardware 450. The partitions 480 are logical units of isolation by the hypervisor. Each partition 480 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. Any virtual machine executing on the partition 480 can be customized in accordance with a user request, which includes a queue allocation for each network interface in the virtual machine, as described herein.

Figure 5:
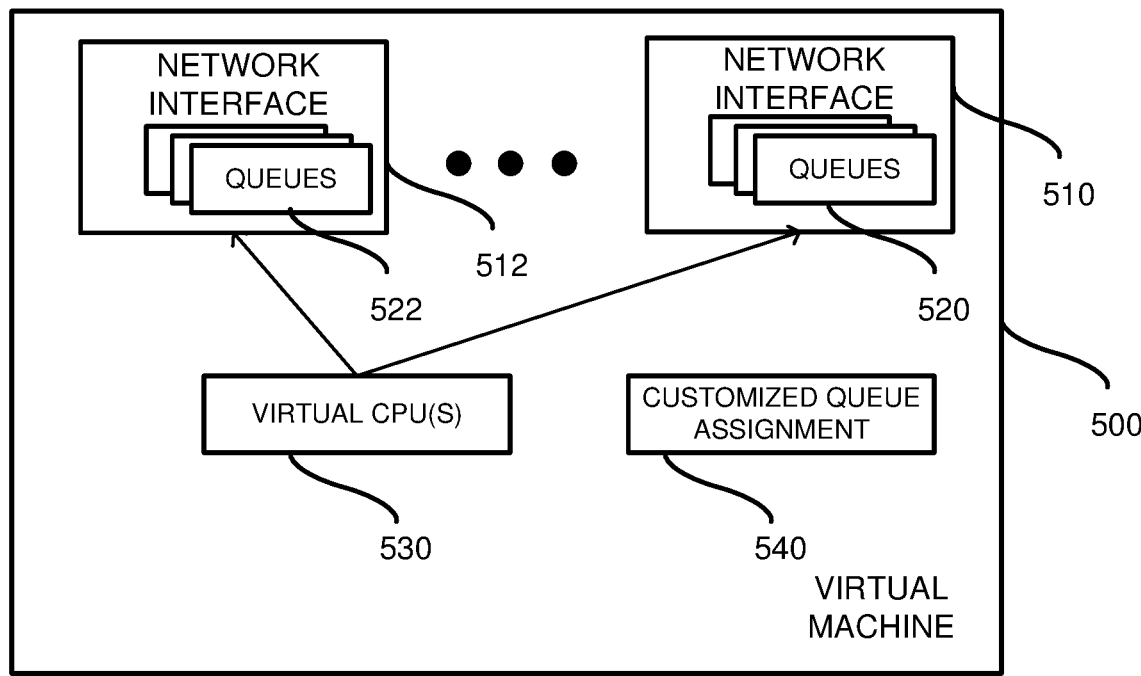
FIG. 5 shows a virtual machine customized in accordance with a user assignment of queues.

FIG. 5 shows further details of a virtual machine 500, which can be the same as virtual machine 110 (FIG. 1). The virtual machine 500 can include multiple network interfaces, two of which are shown at 510, 512, but any number can be included. Each interface 510, 512 can include an independent number of queues 520, 522, respectively, from each other and the number of queues 520, 522 can be independently controlled by a user, such as through an API request. The queues can represent memory descriptors or addresses of memory in a host computer that can be used to store data packets. The queues can be used for transmitting or receiving network packets. Each network interface 510, 512 can be associated with its own virtual CPU 530. A customized queue assignment can be stored in a memory 540 and describes or controls which queues 520, 522 are assigned to which network interfaces 510, 512. A user can modify the customized queue assignment 540 through an API, such as upon launch as shown in FIG. 1 at 112, or after launch (dynamically).

FIG. 6 is a flowchart according to one embodiment for launching a virtual machine with a customized queue allocation. In process block 610, an API request is received to launch a virtual machine. The API request can include one or more parameters associated with a number of queues per network interface. For example, in FIG. 1, the API request 112 can include a virtual machine image identifier that indicates a type of virtual machine to launch and queue allocation parameters. Such parameters can identify each network interface and a number of queues for each network interface. In process block 620, a server computer can be determined upon which to launch the virtual machine. For example, in FIG. 3, the instance manager 350 can determine which server computer in a capacity pool 318 has a partition 480 (FIG. 4) available. In process block 630, the virtual machine can be launched and assigned a pool of queues. For example, in FIG. 1, the virtual machine image can be associated with metadata 122, which includes a pool of queues available for the associated virtual machine. In process block 640, the virtual machine interfaces can be allocated to the virtual machine. For example, in FIG. 1, the network interfaces 150 can be allocated to the virtual machine 110 by the hypervisor 130. Finally, in process block 650, the queues can be allocated from the pool of queues to the virtual network interfaces. For example, in FIG. 1, the hypervisor 130 can allocate the transmit 160 and receive 162 queues to the network interfaces 150.

Figure 7:
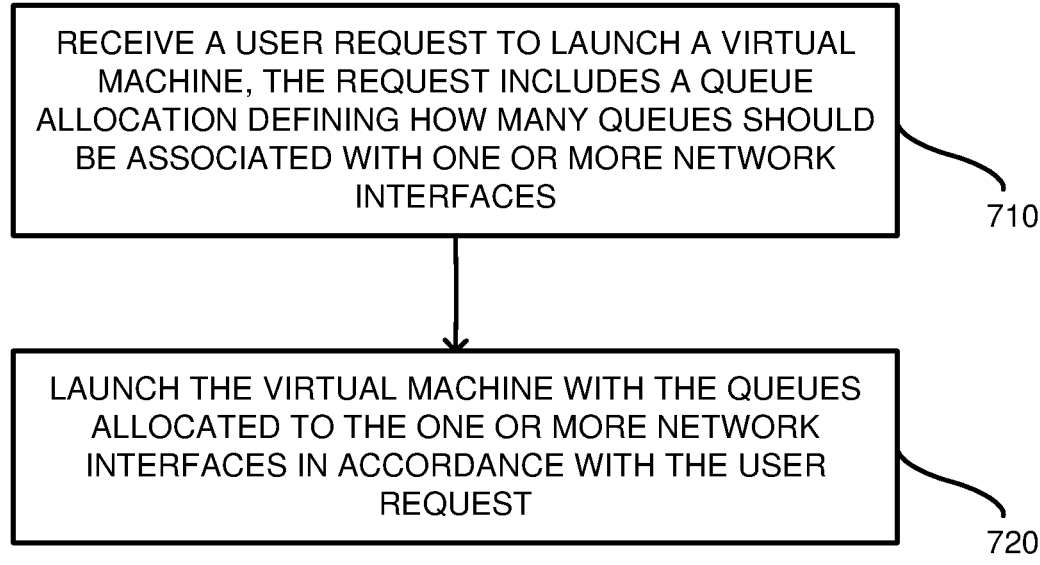
FIG. 7 is a flowchart according to another embodiment for customizing queues in accordance with a user request.

FIG. 7 is a flowchart according to another embodiment for launching a virtual machine. In process block 710, a user request is received to launch a virtual machine. The request can include a queue allocation defining how many queues are associated with one or more network interfaces. For example, in FIG. 3, a user request can be received from the client device 310 and ultimately received by the instance manager 350. Additionally, in FIG. 5, the user request can be received to modify the customized queue assignment 540 that customizes how many and what type of queues 520, 522 are located on the network interfaces 510, 512. In process block 720, a virtual machine can be launched with the queues allocated in accordance with the user request. For example, in FIG. 1, the virtual machine 110 can be launched with the number of queues 160, 162 per network interface 150 as defined in the user request 112.

Figure 8:
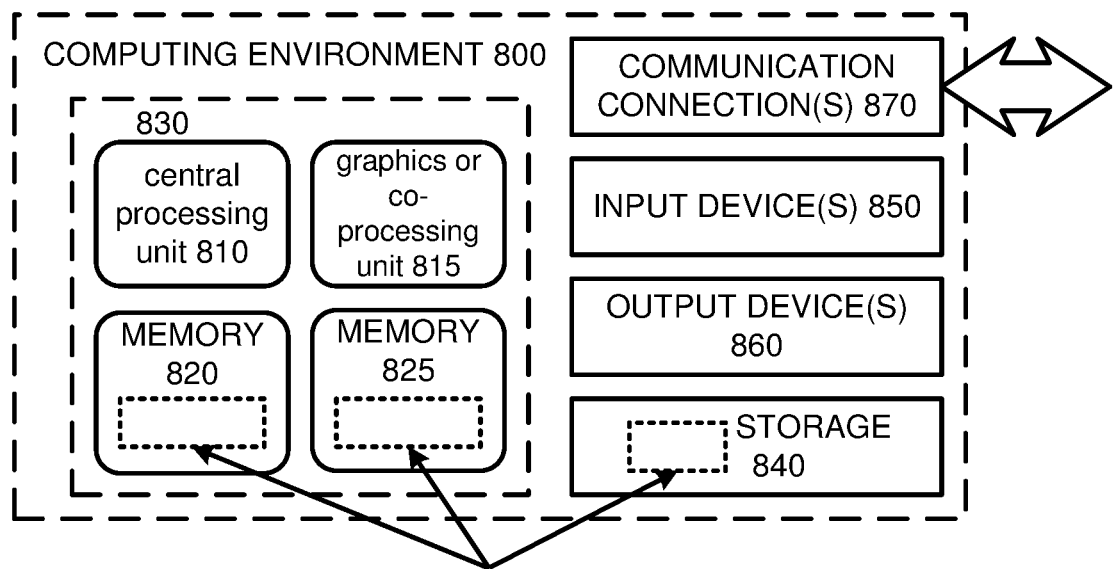
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of launching a virtual machine, the method comprising:

receiving an Application Programming Interface (API) request to launch a virtual machine, wherein the API request includes one or more parameters associated with queues for each of a plurality of interfaces;

determining a server computer upon which to launch the virtual machine;

launching the virtual machine on the server computer and assigning a pool of queues to the virtual machine;

allocating a plurality of virtual interfaces to the virtual machine by using metadata stored in association with a virtual machine registration record; and based upon the API request, allocating the queues from the pool of queues to the virtual interfaces associated with the virtual machine, wherein an instance manager uses the metadata in the virtual machine registration record and the one or more parameters associated with the queues in the API request to instruct a hypervisor to allocate the queues from the pool of queues in accordance with the API request, wherein a different number of queues are assigned to different ones of the plurality of virtual interfaces based upon the API request.

2. The method of claim 1, wherein the API request includes a virtual machine identifier used to identify the virtual machine.

3. The method of claim 1, wherein the queues include transmit and receive queues for transmitting and receiving network packets.

4. The method of claim 1, wherein the API request includes at least a first number of queues associated with a first virtual network interface and a second number of queues associated with a second virtual network interface, wherein a combined number of the first number of queues and the second number of queues are less than a number of queues in the pool of queues.

5. The method of claim 1, wherein a hypervisor executing on the server computer assigns a first portion of the pool of queues to the virtual interfaces, which are virtual networking interfaces, and a second portion of the pool of queues to virtual interfaces which are used for storage.

US 12,596,565 B2

13

6. A method, comprising:
receiving a user request to launch a virtual machine,
wherein the request includes a queue allocation defin-
ing how many queues should be on each of two or more
interfaces associated with the virtual machine, wherein
a number of the queues differs between the two or more
interfaces based upon the user request, which specifies
the number of queues on each of the two or more
interfaces; and
launching the virtual machine on a server computer with
the queues allocated to the two or more interfaces in
accordance with the user request, wherein the launch-
ing of the virtual machine is controlled by an instance
manager that retrieves metadata from a registration
record associated with the virtual machine, wherein the
metadata defines an available number of queues in a
queue pool and wherein the instance manager directs a
hypervisor to launch the virtual machine on the server
computer and instructs the hypervisor on allocation of
the queues to the two or more interfaces in accordance
with the user request.

7. The method of claim 6, wherein a hypervisor executing
on the server computer assigns the queues from a pool of
queues available to the one or more interfaces, wherein a
first portion of the pool of queues are assigned to the one or
more interfaces that are used for networking and a second
portion of the pool of queues are assigned to the one or more
interfaces that are used for storage.

8. The method of claim 6, wherein the user request is an
Application Programming Interface (API) request that
includes a virtual machine image identifier.

9. The method of claim 6, wherein the queues are transmit
and receive queues.

10. The method of claim 6, further including receiving an
additional user request to dynamically modify the queue
allocation.

11. The method of claim 6, wherein the virtual machine
includes multiple processors and at least some of the mul-
tiple processors have at least one of the queues assigned to
it for packet processing.

12. The method of claim 6, wherein the user request
allows customization of how many queues are associated
with each interface by a user outside of a compute service
provider.

13. The method of claim 6, further including selecting the
server computer from a pool of server computers upon
which to launch the virtual machine.

14. The method of claim 6, wherein the queue allocation
is stored as metadata in a virtual machine registration record.

15. The method of claim 6, wherein the queues are
assigned from a first pool of queues used for networking and
a second pool of queues used for storage.

16. One or more computer-readable media comprising
computer-executable instructions that, when executed, cause
a computing system to perform a method comprising:
receiving a request to launch a virtual machine, wherein
the request includes at least two parameters used to
customize a number of queues on at least first and
second interfaces linked to the virtual machine,
wherein a first of the two parameters in the request
assigns a first number of queues to the first interface
and the second of the two parameters in the request
assigns a second number of queues to the second
interface, and wherein the first number of queues differs
from the second number of queues; and
launching the virtual machine in association with the first
interface and the second interface with the number of
queues on the first and second interfaces matching the
first and second parameters in the request, wherein the
launching of the virtual machine is controlled by an
instance manager that retrieves metadata that defines an
available number of queues in a queue pool and
wherein the instance manager directs a hypervisor to
launch the virtual machine with the queues allocated to
the first and second interfaces in accordance with the
request.

17. The computer-readable storage medium according to
claim 16, wherein the method further comprises:
assigning the queues to one or more processors executing
on the virtual machine.

18. The computer-readable storage medium according to
claim 16, wherein the request is an Application Program-
ming Interface (API) request received from a client com-
puter located outside of a compute service provider.

19. The computer-readable storage medium according to
claim 16, wherein the method further comprises:
selecting a server computer from a pool of server com-
puters and wherein the launching of the virtual machine
occurs on the selected server computer.

20. The computer-readable storage medium according to
claim 16, wherein the user request allows customization of
how many queues are associated with each interface by a
user outside of a compute service provider.

21. The computer-readable storage medium according to
claim 16, wherein the method further comprises:
receiving an additional request to dynamically modify the
customization of the number of queues.

22. The computer-readable storage medium according to
claim 16, wherein a first portion of the queues are used for
networking and a second portion of the queues are used for
storage.

23. The computer-readable storage medium of claim 22,
wherein the first portion of queues and the second portion of
queues are from a same pool of queues or from different
pools of queues.

* * * * *